United States Patent
Underbrink et al.

(10) Patent No.: US 6,980,772 B1
(45) Date of Patent: Dec. 27, 2005

(54) WIRELESS COMMUNICATIONS SYSTEM UTILIZING DIRECTIONAL WIRELESS COMMUNICATION DEVICE

(75) Inventors: Paul A. Underbrink, Lake Forest, CA (US); Kelly H. Hale, Alisoviejo, CA (US); Guang-Ming Yin, Foothill Ranch, CA (US); Patrick D. Ryan, Yorba Linda, CA (US); Joseph H. Colles, Ponsall, CA (US); Daryush Shamlou, Laguna Niguel, CA (US); Christian Levesque, Fountain Valley, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 457 days.

(21) Appl. No.: 09/821,110

(22) Filed: Mar. 29, 2001

Related U.S. Application Data

(62) Division of application No. 09/394,189, filed on Sep. 13, 1999.

(51) Int. Cl.[7] .......................... H04B 1/00; H04B 15/00
(52) U.S. Cl. .................. 455/63.4; 455/25; 455/575.5; 455/575.7; 455/440; 455/271; 455/300; 370/331
(58) Field of Search ........................ 455/575.1, 575.5, 455/90.3, 25, 344, 347, 348, 501, 522, 63.1, 455/63.4, 271, 274, 283, 278.1, 286, 290, 455/414.1, 456.3, 456.5, 66.1, 436–454, 455/269, 300; 343/772, 775, 781 R, 834, 343/841; 370/331–334

(56) References Cited

U.S. PATENT DOCUMENTS

| | | | |
|---|---|---|---|
| 4,196,394 A | 4/1980 | Adams .................. 455/289 |
| 4,849,767 A | 7/1989 | Naitou .................. 343/745 |
| 5,220,335 A * | 6/1993 | Huang ............... 343/700 MS |
| 5,327,575 A * | 7/1994 | Menich et al. ............. 455/437 |
| 5,335,366 A | 8/1994 | Daniels ...................... 455/89 |
| 5,338,896 A | 8/1994 | Danforth .................. 174/35 R |
| 5,400,040 A | 3/1995 | Lane et al. ............. 343/700 MS |
| 5,465,391 A * | 11/1995 | Toyryla ...................... 455/518 |
| 5,530,919 A | 6/1996 | Tsuru et al. .................. 455/90 |
| 5,542,106 A | 7/1996 | Krenz et al. .................. 455/90 |
| 5,613,221 A | 3/1997 | Hunt .......................... 455/89 |
| 5,678,202 A | 10/1997 | Filimon et al. ............... 455/89 |
| 5,708,833 A | 1/1998 | Kinney et al. ............. 395/800 |
| 5,802,473 A * | 9/1998 | Rutledge et al. ............. 455/446 |
| 5,805,067 A * | 9/1998 | Bradley et al. ............. 340/635 |
| 5,809,422 A * | 9/1998 | Raleigh et al. ............. 455/449 |
| 5,826,201 A | 10/1998 | Gratias .................... 455/575 |
| 5,887,261 A * | 3/1999 | Csapo et al. ............... 455/450 |
| 5,930,713 A * | 7/1999 | Nguyen .................... 455/440 |
| 5,952,964 A | 9/1999 | Chan ....................... 342/368 |
| 5,983,109 A * | 11/1999 | Montoya ................. 455/456.2 |
| 6,009,330 A * | 12/1999 | Kennedy, III et al. ....... 455/445 |
| 6,052,598 A * | 4/2000 | Rudrapatna et al. ..... 455/456.1 |
| 6,130,607 A | 10/2000 | McClanahan et al. ...... 340/436 |
| 6,134,420 A | 10/2000 | Flowerdew et al. .......... 455/41 |
| 6,141,558 A * | 10/2000 | Chen ..................... 455/456.1 |
| 6,456,856 B1 * | 9/2002 | Werling et al. ........... 455/575.5 |

\* cited by examiner

Primary Examiner—Charles Craver
(74) Attorney, Agent, or Firm—Christopher J. Rourk; Godwin Gruber LLP

(57) ABSTRACT

A system for wireless communications is provided. The system includes a hand-held wireless communications device, such as a cell phone. An antenna is connected to the cell phone. The antenna radiates radio waves over an area of less than 360 degrees of arc, such as in a cardioid or hemisphere. The antenna is oriented such that hemisphere is in the direction away from a head of a user of the cell phone.

17 Claims, 5 Drawing Sheets

WIRELESS COMMUNICATIONS SYSTEM UTILIZING DIRECTIONAL WIRELESS COMMUNICATION DEVICE

This application is a divisional application of Ser. No. 09/394,189, "Directional Antenna for Handheld Wireless Communication Device," filed Sep. 13, 1999, to which priority for the present application is claimed.

FIELD OF THE INVENTION

The present invention pertains to a directional antenna for a hand-held wireless communications device, and more particularly to an antenna for a hand-held wireless communications device that reduces the level of electromagnetic radiation that is directed towards a user of the device.

BACKGROUND

Hand-held wireless communications devices are well known in the art. Such devices typically utilize a single monopole antenna for both transmission and reception of electromagnetic radiation. Data is encoded in various formats on the electromagnetic radiation, and communication between the device and a base station is accomplished by coding and decoding data onto the electromagnetic radiation and transmitting it between the hand-held device and the base station. The base station is typically connected to a land-based network, and routes the call to a central office switch.

Public concern is increasing over the amount of electromagnetic radiation that a user of a hand-held wireless communications device may be exposed to. For example, studies have indicated that users of such devices may be at greater risk for developing certain types of cancer. Because of the monopole antenna design of most, if not all, hand-held wireless communications devices, a large amount of the electromagnetic radiation generated by the devices for transmission to a base station is absorbed by the head of the user.

Despite the great amount of public concern that has developed over the potential harm caused by hand-held wireless communications devices, few actions have been taken beyond the performance of additional studies of the problem. Even if it is ultimately proven that there is no cause for concern, a great deal of time and money will have been expended in studying the problem, discussing the potential health risks in public forums, and educating the public to overcome anecdotal information to the effect that such devices may cause health hazards.

SUMMARY OF THE INVENTION

The present invention provides a directional antenna for a hand-held wireless communications device, in which the field intensity of the electromagnetic radiation that is emitted from the device is reduced in the direction of a user of the device.

In accordance with one aspect of the present invention, a system for wireless communications is provided. The system includes a hand-held wireless communications device, such as a cell phone. An antenna is connected to the cell phone. The antenna radiates radio waves over an area of less than 360 degrees of arc, such as in a cardioid or hemisphere. The antenna is oriented such that the cardioid or hemisphere is in the direction away from a head of a user of the cell phone, so as to minimize radiation exposure to the head of the user.

The present invention provides many important technical advantages. One important technical advantage of the present invention is a handheld wireless communications device that radiates electromagnetic energy away from a user of the device. Thus, the user is not exposed to potentially harmful electromagnetic radiation. Another important technical advantage of the present invention is a system for communications that accommodates handheld wireless communications devices that utilize directional antennae. The system of the present invention coordinates base stations in a manner that facilitates communications with handheld wireless communications devices having directional antennae.

Another important technical advantage of the present invention is that it provides a higher system gain resulting in reduced transmission power amplification requirements and longer talk time. The present invention also provides improved pass band characteristics that reduce the need for filtering in both the transmit and receive patterns. The present invention further allows the impedance of the antenna to be adjusted, so as to better match the impedance of the power amplifier, which provides increased efficiency.

Yet another important technical advantage of the present invention is that the presence of the user does not impair the quality of the match with the transmit and receive circuits by altering the impedance of the antenna.

Those skilled in the art will further appreciate the advantages and superior features of the invention together with other important aspects thereof on reading the detailed description which follows in conjunction with the drawings.

DETAILED DESCRIPTION OF PREFERRED EMBODIMENTS

Figure 1:
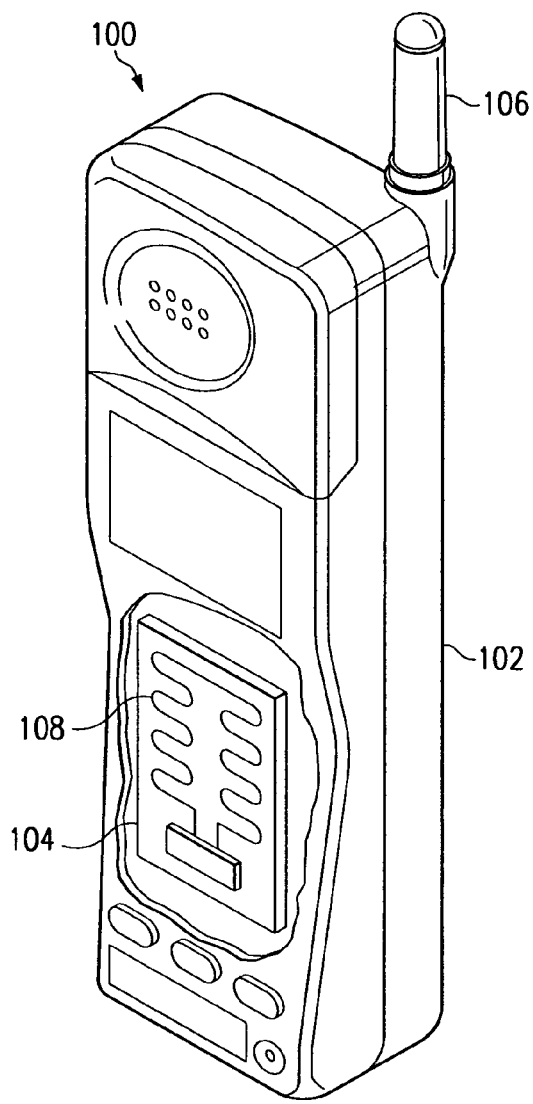
FIG. 1 is a diagram of a handheld wireless communications device having a directional transmit antenna in accordance with an exemplary embodiment of the present invention.

In the description which follows, like parts are marked throughout the specification and drawing with the same reference numerals, respectively. The drawing figures may not be to scale and certain components may be shown in generalized or schematic form and identified by commercial designations in the interest of clarity and conciseness.

FIG. 1 is a diagram of a handheld wireless communications device 100 having a directional transmit antenna in accordance with an exemplary embodiment of the present invention. Handheld wireless communications device 100 includes housing 102, integrated circuit 104, monopole antenna 106, and patch antenna 108. Patch antenna 108 allows handheld wireless communications device 100 to transmit electromagnetic radiation carrying encoded data to a base station in a direction away from a user of handheld wireless communications device 100.

Housing 102 is configured to hold all of the components of handheld wireless communications device 100, with the exception of monopole antenna 106. Housing 102 may be a suitable handheld wireless communications device case, and may be configured to allow monopole antenna 106 to slide into and out of housing 102 so as to protect monopole antenna 106 from damage when it is not in use.

Integrated circuit 104 is a packaged integrated circuit that includes one or more system components of handheld wireless communications device 100. For example, integrated circuit 104 may include data processing systems, code division multiple access systems for encoding data onto and decoding data from electromagnetic radiation, or other suitable systems used by handheld wireless communications device 100. Integrated circuit 104 is coupled to other components and systems of handheld wireless communications device 100, such as a keypad, a microphone, a speaker, and other suitable components and systems. In addition, integrated circuit 104 includes patch antenna 108. Patch antenna 108 may thus be contained within the integrated circuit packaging of integrated circuit 104. Patch antenna may also or alternatively be contained within other packaging, where suitable.

Monopole antenna 106 is a suitable monopole antenna, such as a center-wound or graphite core monopole antenna. Monopole antenna 106 is coupled to receiver circuitry of handheld wireless communications device 100. Monopole antenna 106 is used to receive electromagnetic radiation that carries encoded data in a suitable format. For example, monopole antenna 106 may be used to receive code division multiple access encoded data, analog encoded data, or other suitable forms of wireless encoded data.

Patch antenna 108 is used to transmit electromagnetic radiation on which has been encoded data. For example, patch antenna 108 may be used to transmit code division multiple access data, analog data, or other suitable forms of data. Patch antenna 108 is configured so as to radiate energy in a direction away from one plane. For example, patch antenna 108 may radiate the majority of energy over less than 360 degrees of arc, such that the radiated intensity over the less than 360 degrees of arc is significantly greater than the radiated intensity over the remaining degrees of arc in the opposite direction of radiation. In this manner, patch antenna 108 may be used to transmit electromagnetic radiation such that it is oriented away from the head of the user holding handheld wireless communications device 100.

Furthermore, the impedance of patch antenna 108 may be selected to match the output impedance of the transmitter amplifier of handheld wireless communications device 100. For example, if the output impedance of the transmitter amplifier of handheld wireless communications device 100 is 10 ohms, the impedance of patch antenna 108 may be selected to be 10 ohms, thus resulting in an optimal match between the output impedance of the transmitter amplifier and the load impedance of the antenna. Patch antenna 108 thus provides advantages over standard monopole antennas having fixed output impedances in the range of 50 ohms, which may result in non-optimal power consumption characteristics. The impedance and energy radiation characteristics of patch antenna 108 may typically be determined through a three dimensional finite element analysis of patch antenna 108.

In addition, using separate antennae for transmitting and receiving functionality simplifies the systems and circuitry of handheld wireless communications device 100. These systems and circuitry do not need to separate transmit and receive signals from a single antenna. Thus, the transmit circuitry may be coupled to an antenna that will only be used for transmitting energy, and the receive circuitry may be coupled to an antenna that is only used to receive energy. It is not necessary to protect the transmit circuitry from potential adverse effects that may be caused by the receive circuitry, nor is it necessary to protect the receive circuitry from potential adverse effects that may be caused by the transmit circuitry.

The present invention also provides for system filtering through patch antenna 108, which filters the radiated signal by radiating the radiated signal within a narrow, predetermined band. Patch antenna 108 provides a higher system gain, which results in reduced transmission power amplification requirements and longer talk time. Patch antenna 108 also provides improved pass band characteristics that reduce the need for filtering in both the transmit and receive patterns. The impedance of patch antenna 108 may be adjusted so as to better match the impedance of the power amplifier and to provide increased efficiency. The presence of the user also does not modify the near field impedance of patch antenna 108, and this does not impair the quality of the match between the patch antenna 108 and the transmit circuit.

In operation, a user of handheld wireless communications device 100 holds the device such that it is oriented with a speaker placed next to the user's ear and with a microphone placed next to the user's mouth. Because of this known orientation, it is possible to configure patch antenna 108 such that the electromagnetic energy radiated by patch antenna 108 will be transmitted away from the user. This configuration allows a user of handheld wireless communications device 100 to avoid exposure to the radiated electromagnetic radiation and to still be provided with communication services.

The monopole antenna 106 that is used to receive radiated electromagnetic radiation does not subject the user to any additional electromagnetic radiation beyond what is present in the ambient environment. Separate transmit and receive antennae also simplify the circuitry of the handheld wireless communications device, as it is not necessary to separate the transmit and receive signals on a single antenna.

Figure 2:
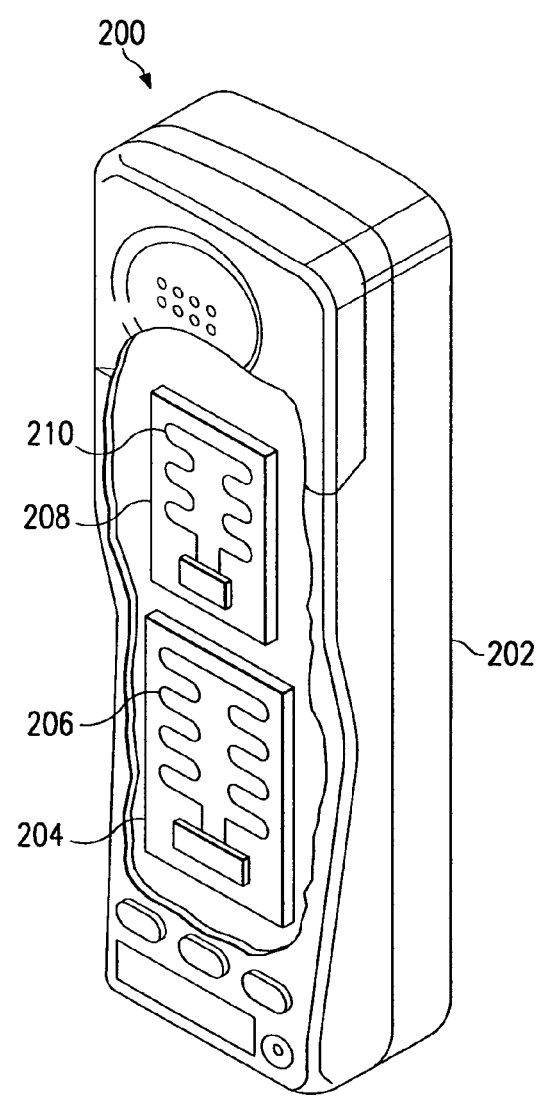
FIG. 2 is a diagram of a handheld wireless communications device having a directional transmit antenna and a directional receive antenna in accordance with an exemplary embodiment of the present invention.

FIG. 2 is a diagram of a handheld wireless communications device 200 in accordance with an exemplary embodiment of the present invention. Handheld wireless communications device 200 includes housing 202, integrated circuit 204 with patch antenna 206, and integrated circuit 208 with patch antenna 210.

Housing 202 contains all of the components of handheld wireless communications device 200, including all antennae. For example, housing 202 does not require any external penetrations that allow antennae such as monopole antenna 106 to be inserted or removed. Thus, housing 202 may be formed in a manner that prevents water or moisture from entering housing 202. This structure allows handheld wireless communications device 200 to be used in environments where there is a high level of ambient moisture.

Integrated circuit 204 and patch antenna 206 are used to transmit electromagnetic radiation that has been encoded with data. Integrated circuit 204 may include one or more additional systems of handheld wireless communications device 200, but also includes patch antenna 206 which is coupled to a transmit amplifier of handheld wireless communications device 200. The transmit amplifier may be contained within integrated circuit 204, or may also or alternatively be contained within other components or systems of handheld wireless communications device 200. For example, the transmit amplifier may comprise several stages, one of which is in integrated circuit 204 and others of which are external to integrated circuit 204 but which are contained within housing 202.

Integrated circuit 208 and patch antenna 210 are used to receive electromagnetic radiation that has been encoded with data. Integrated circuit 208 may include one or more additional systems of handheld wireless communications device 200, such as receive amplifiers or demodulators, and also includes receive patch antenna 210. Integrated circuit 208 is coupled to components and systems of handheld wireless communications device 200, such as a keypad, a microphone, a speaker, or other suitable components or systems.

Patch antennae 206 and 210 are used to transmit and receive, respectively, electromagnetic radiation that carries encoded data. Patch antenna 206 may be tuned to a different operating frequency than that of patch antenna 210, such that patch antennae 206 and 210 may be used to transmit and receive at the same time. The output impedance of patch antenna 206 may be selected to match the output impedance of the transmitter amplifier, so as to optimize the power consumption of the transmitter amplifier. Likewise, the output impedance of patch antenna 210 may be selected to match the output impedance of the receiver amplifier, so as to optimize the power consumption of the receiver amplifier.

In operation, handheld wireless communications device 200 is used to communicate with one or more base stations. A user of handheld wireless communications device 200 will place the device in an orientation such that a speaker of the device is adjacent to the user's ear, and a microphone of the device is adjacent to the user's mouth. Because of this known configuration, patch antennae 206 and 210 may be oriented so that the electromagnetic radiation that is generated by patch antenna 206 is transmitted away from the user. Because the base station antenna that is receiving the transmitted radiation will typically also be transmitting data that is encoded onto electromagnetic radiation to the user, patch antenna 210 may be used and optimized to receive electromagnetic radiation from such a transmit antenna.

Figure 3:
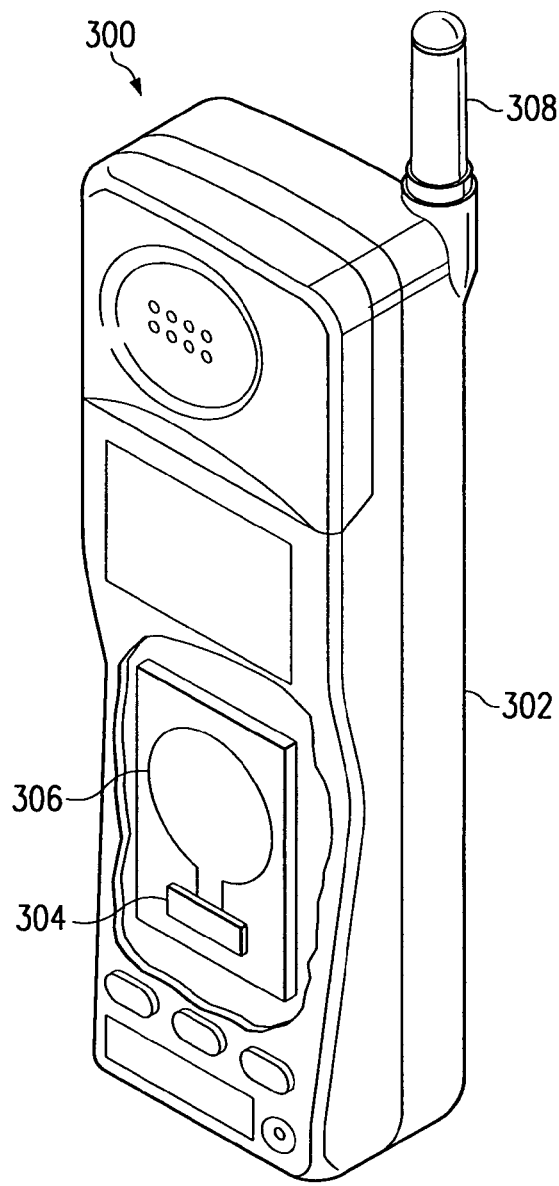
FIG. 3 is a diagram of a handheld wireless communications device having a loop transmit antenna in accordance with an exemplary embodiment of the present invention.

FIG. 3 is a diagram of a handheld wireless communications device 300 in accordance with an exemplary embodiment of the present invention. Handheld wireless communications device 300 includes housing 302, transmit amplifier 304, loop antenna 306, and monopole antenna 308.

Housing 302 of handheld wireless communications device 300 holds all of the components of handheld wireless communications device 300 except monopole antenna 308. For example, housing 302 may be configured such that monopole antenna 308 moves in and out of the housing 302. In this manner, housing 302 protects all internal components.

Transmit amplifier 304 and loop antenna 306 are used to transmit data that has been encoded onto electromagnetic radiation. Loop antenna 306 is configured to transmit the electromagnetic radiation in a direction away from the user. For example, because of the orientation of handheld wireless communications device 300, a user will hold the device such that a speaker is placed in the proximity of the user's ear and a microphone is placed near the user's mouth. This known configuration allows loop antenna 306 to be oriented such that it radiates electromagnetic radiation from a plane in a direction that is oriented away from the user. In this manner, the user is not exposed to potentially harmful electromagnetic radiation from handheld wireless communications device 300.

The impedance of loop antenna 306 may also be selected to match the output impedance of transmit amplifier 304. In this manner, power consumption of the transmit circuitry of handheld wireless communications device 300 may be optimized, resulting in longer battery life, a farther transmission reach of the device, and other important technical advantages.

Monopole antenna 308 receives electromagnetic radiation that has been transmitted from a base station or other wireless central station. Monopole antenna 308 may slide into or out of housing 302, such as to improve reception where needed and to provide protection of monopole antenna 308 when it is not in use. Monopole antenna 308 is coupled to components or systems of handheld wireless communications device 300, such as a receive amplifier.

In operation, handheld wireless communications device 300 is used to transmit and receive electromagnetic radiation to facilitate wireless communications. Loop antenna 306 of handheld wireless communications device 300 is oriented such that the radiation field from loop antenna 306 emanates from a plane in a direction away from the user. This allows the user to avoid exposure to potentially harmful electromagnetic radiation although while still allowing the user to communicate with a base station.

Figure 4:
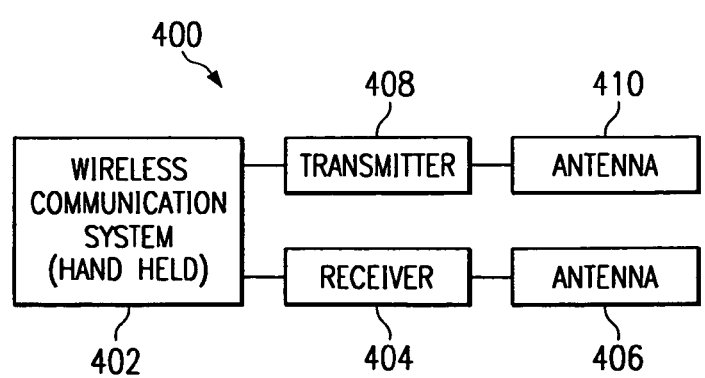
FIG. 4 is a block diagram of a communications system in accordance with an exemplary embodiment of the present invention.

FIG. 4 is a block diagram of a communications system 400 in accordance with an exemplary embodiment of the present invention. Communications system 400 includes handheld wireless communications system 402, which is coupled to transmitter 408 and antenna 410, and which is also coupled to receiver 404 and antenna 406.

Handheld wireless communications system 402 is a suitable handheld wireless communications system. For example, handheld wireless communications system 402 may comprise a code division multiple access handheld transceiver unit, an AMPS analog handheld wireless communications transceiver unit, a PCS wireless communications transceiver unit, or other suitable handheld wireless communications devices. Handheld wireless communications system 402 does not contain circuitry that allows a single antenna to be utilized for both transmission and reception. For example, known wireless communications systems contain circuitry that allows transmission and reception to occur over a single antenna, such as by filtering different frequency components from a monopole antenna, through time division multiple access methods, or by other suitable means. The present invention allows handheld wireless communications system 402 to connect directly to receiver 404 and transmitter 408, and does not require additional circuitry to separate transmitted and received signals.

Receiver 404 is a standard receiver circuit that is used to amplify electromagnetic radiation signals received from antenna 406. For example, receiver 404 may include amplification and demodulation components that shift the received frequency either down or up in value, and may also decode data from the frequency, such as by removing a suitable noise component, performing a frequency demodulation, or by performing other suitable functions on the received signal.

Antenna 406 is a receive antenna that is coupled to receiver 404. For example, antenna 406 may be a monopole antenna, a patch antenna, a loop antenna, or other suitable antennas. The impedance of antenna 406 may be selected to match the output impedance of receiver 404, such that power consumption by receiver 404 is optimized.

Transmitter 408 is a transmit amplifier and modulation system that is used to transmit electromagnetic radiation carrying encoded data over antenna 410. Transmitter 408 may be a standard handheld wireless communications device transmitter, including amplification components and systems, modulation components and systems, and other suitable components and systems.

Antenna 410 is a transmit antenna that is coupled to transmitter 408. Antenna 410 may be a patch antenna, a loop antenna, or other suitable types of antenna. Antenna 410 is configured to radiate electromagnetic radiation having a field intensity that is directional. For example, antenna 410 may radiate over a section, such as less than 360 degrees of arc, in which the radiated field intensity is evenly distributed. The remaining section of arc may have a radiated field intensity that approaches zero. In this manner, antenna 410 may be used to direct the radiated energy away from the user of handheld wireless communications system 402, thus minimizing exposure of the user to potentially harmful electromagnetic radiation.

In operation, communications system 400 is used to provide communications in a handheld wireless communications device. Separate receive and transmit circuitry is optimized for use in communications system 400, such as by the use of separate transmit and receive antennae. In this manner, the efficiency and reliability of the transmit and receive systems may be optimized to improve power consumption characteristics, increase the range of the communications system 400, and to utilize patch antenna or other suitable directional antennae for transmitting and receiving radiated electromagnetic energy carrying encoded data.

Figure 5:
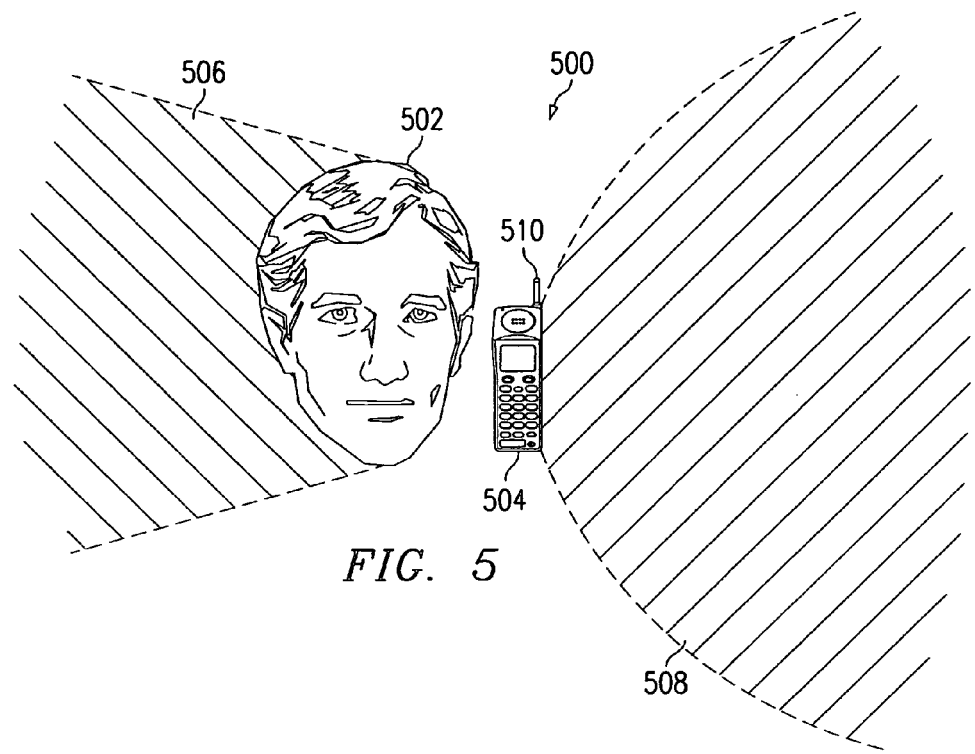
FIG. 5 is a diagram of electromagnetic field radiation patterns in accordance with an exemplary embodiment of the present invention.

FIG. 5 is an electromagnetic field map 500 in accordance with an exemplary embodiment of the present invention. Electromagnetic field map 500 shows the head of a user 502 in relation to a handheld wireless communications device 504. Because of the location of the head of the user 502 in relationship to the handheld wireless communications device 504, a dead zone 506 is created in which the head of the user 502 effectively blocks or greatly decreases the emitted field strength of a monopole antenna in the location of handheld wireless communications device 504. Thus, not only would the head of the user 502 limit the transmission of electromagnetic radiation from such a device, but would also absorb such electromagnetic radiation, possibly creating health problems or other detrimental effects in the head of the user 502.

Handheld wireless communications device 504 emits exemplary electromagnetic radiation in field 508, which extends approximately 180 degrees, away from a plane parallel to the head of the user 502. Although a 180 degree arc is shown, other suitable radiation patterns may be used, such as a cardioid pattern. In the configuration shown, the radiated electromagnetic radiation from handheld wireless communications device 504 has approximately the same field strength at a base station, but does not result in electromagnetic radiation energy being wasted by absorption in the head of the user. This configuration allows a more efficient use of the radiated electromagnetic radiation, which may result in a greater field strength if the same amount of radiated energy is utilized, without creating health risks to the user 502.

In operation, a user utilizes handheld wireless communications device 504 in the manner shown by electromagnetic field map 500, such that the transmission of electromagnetic radiation carrying encoded data by handheld wireless communications device 504 in field 508 is oriented in a cardioid or hemisphere away from the head of the user 502. This configuration optimizes the use of the radiated electromagnetic energy in that it is directed where the radiated energy will reach the intended receiver, and does not result in wasted absorption of such electromagnetic radiation into objects that block the radiation from reaching the intended receiver. If the same amount of energy is used to transmit in a single hemisphere, then the field strength and corresponding effective reach of the antenna may be increased without increasing the power consumption of the handheld wireless communications device that utilizes the antenna.

Figure 6:
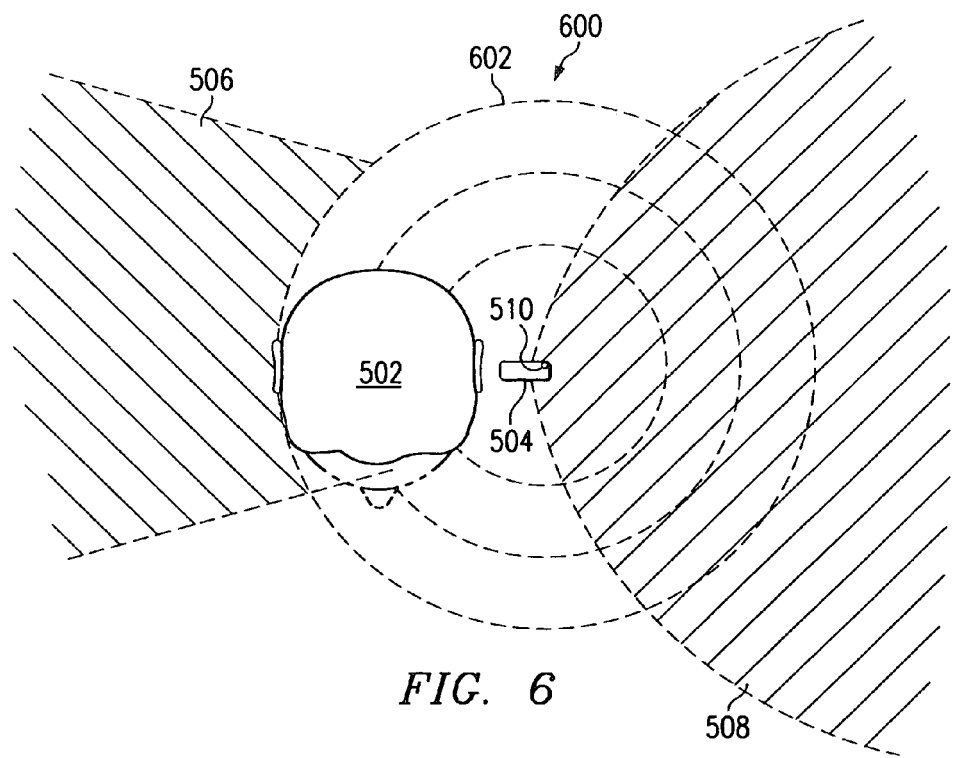
FIG. 6 is a diagram of the electromagnetic fields generated by a handheld wireless communications device in accordance with an exemplary embodiment of the present invention.

FIG. 6 is an electromagnetic field map 600 of the electromagnetic fields generated by a handheld wireless communications device 504 in accordance with an exemplary embodiment of the present invention. Electromagnetic field map 600 includes user 502, handheld wireless communications device 504, and dead zone 506. In addition, electromagnetic field map 600 shows radiated field 508 in an overhead view, as well as reception field 602.

Reception field 602 is the zone over which a monopole antenna 510 may receive radiated electromagnetic radiation from a transmitter at a base station. While a user may receive electromagnetic radiation signals from transmitters within the reception field 602 of handheld wireless communications device 504, the user may only transmit to receivers in the field 508 of the handheld wireless communications device 504. This field orientation may be used to transmit handoff control signals to the handheld wireless communications device 504. When a user changes the orientation of handheld wireless communications device 504, the radiation field emitted by the device may sweep across the present base station that is coordinating communications for the device, to another base station. Nevertheless, the handheld wireless communications device 504 will still be in the reception field for the original base station. This configuration may be used to cause handheld wireless communications device 504 to change to a different operating frequency or time slot that is available for use by the new base station that handheld wireless communications device 504 is illuminating.

Alternatively, handheld wireless communications device 504 may also utilize a transmit antenna with a field that overlaps radiation field 508, such that the orientation of handheld wireless communications device 504 for both reception and transmission is identical. In this configuration, base stations adjacent to the base station that is providing telecommunications services to handheld wireless communications device must be configured to receive handoff of the communications channel when the transmit antenna of the handheld wireless communications device 504 illuminates the new base station receiver antenna.

In operation, a wireless communications system may utilize electromagnetic field map 600 by transmitting data to handheld wireless communications devices 504 that are oriented such that the transmit antenna of the device is oriented in a direction away from the base station that is transmitting to the device. Alternatively, the wireless communications system may utilize transmit and receive fields for the handheld wireless communications device 504 that overlap, such that the base station that is transmitting to the handheld wireless communications device 504 must also be receiving from the device.

Figure 7:
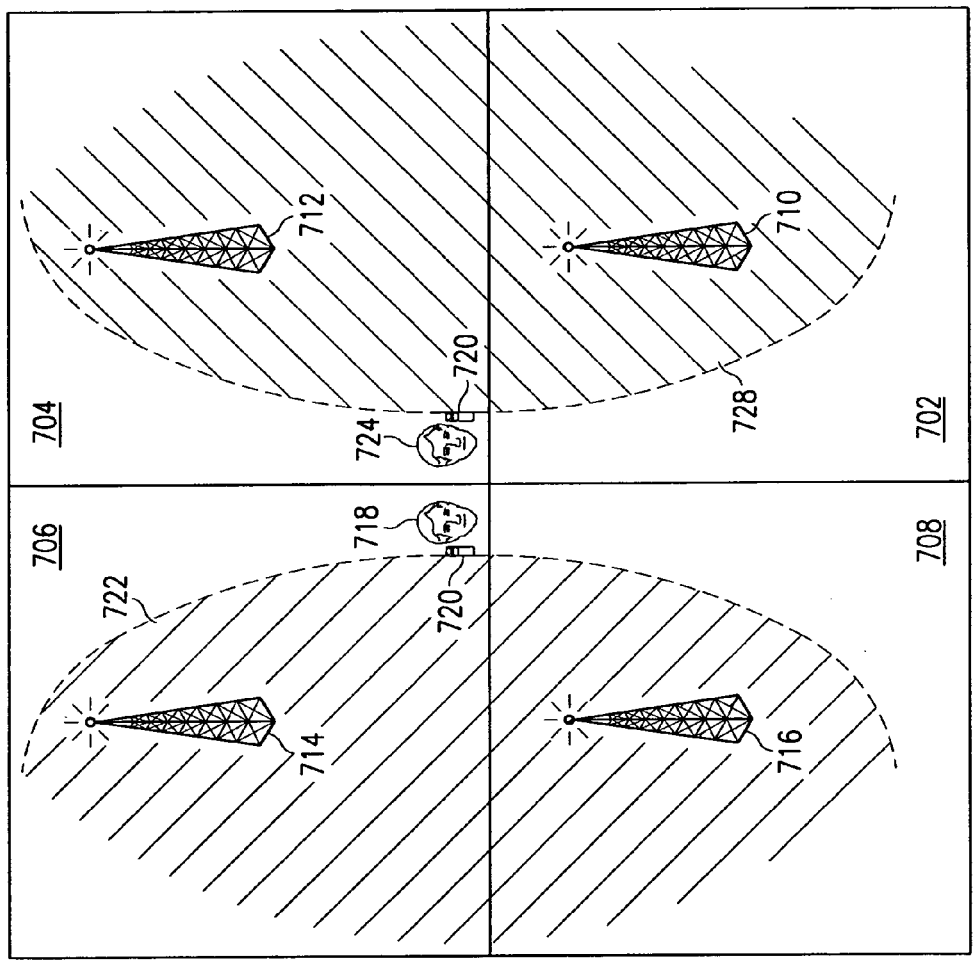
FIG. 7 is a diagram of a cellular system in accordance with an exemplary embodiment of the present invention.

FIG. 7 is a diagram of a cellular system 700 in accordance with teachings of an exemplary embodiment of the present invention. Cellular system 700 includes service cells 702, 704, 706 and 708, each with an associated base station 710, 712, 714, and 716. Each base station 710, 712, 714, and 716 transmits and receives encoded electromagnetic radiation over the quadrilateral area shown, although the radiated and received electromagnetic radiation may extend beyond the borders of the lines shown by service cells 702, 704, 706, and 708. Thus, the actual borders of the service cells may change as a function of atmospheric conditions and the number and location of users.

Cellular system 700 also includes user 718 with handheld wireless communications device 720. Handheld wireless communications device 720 generates a transmission field 722 over which electromagnetic radiation with encoded data is transmitted. As shown, the transmission field 722 created by handheld wireless communications device 720 covers service cells 706 and 708, but only illuminates base station 714. Thus, all transmissions to user 718 must be accomplished through base station 714. If handheld wireless communications device 720 uses a monopole antenna with a uniform, 360 degree reception field, user 718 may receive signals transmitted by each base station 710, 712, 714, and 716. Alternatively, if handheld wireless communications device 720 utilizes a receive antenna that is a patch antenna or other directional antenna that is aligned with the transmit antenna, then the user 718 may only receive signals from the base station that is illuminated by transmission field 722.

Cellular system 700 also includes user 724 with handheld wireless communications device 726. Handheld wireless communications device 726 creates transmission field 728 which as shown illuminates base stations 710 and 712. Likewise, handheld wireless communications device 726 creates transmission field 728 in corresponding service cells 702 and 704. Thus, user 724 may receive cellular services from either base station 710 or 712, and a suitable method may be used by the cellular system 700 to select one of base stations 712 or 710 for serving handheld wireless communications device 726.

Furthermore, when user 718 changes the orientation of handheld wireless communications device 720, such as by turning around 180 degrees, transmission field 722 will sweep across from illuminating base station 714 to illuminating base station 712 and 710, similar to transmission field 728. Thus, cellular system 700 includes call processing functionality that allows a user to change the orientation of handheld wireless communications device 720 or 726 in the manner described without resulting in loss of service, such as by transmitting control signals to a monopole antenna or by a suitable means for use with directional transmit and receive antennae.

For example, a change of orientation may be accommodated by reception of reflected radiated signals, which may be received by the base station servicing the call and amplified in a suitable manner. Such amplification is currently used with existing handheld units, because the signal transmitted through the users head experiences a significant decibel reduction in signal strength, which requires the base station of existing cellular systems to compensate for sudden decreases in received signal quality that may be experienced when the user changes orientation. Thus, existing base station technology may be used where suitable with handheld wireless communications devices having hemispheric electromagnetic radiation fields such as transmission fields 722 and 728.

Alternatively, cellular system 700 may include call routing and call mapping functionality that allocates channel bandwidth between service cells 702, 704, 706 and 708 to accommodate the change in orientation of a user. For example, when a user initiates a wireless call, such as user 718, the handheld wireless communications device 720 may be oriented as shown such that base station 714 is illuminated by transmission field 722. Base station 714 may then set up the call and in the process coordinate with base station 712, base station 716 and other base stations that are adjacent to base station 714. These adjacent base stations may be put on alert, such that they allocate band width or a time slot for user 718 and handheld wireless communications device 720 such that if user 718 changes the orientation of handheld wireless communications device 720, then transmission field 722 will illuminate one of the adjacent base stations with allocated bandwidth or time slots.

Base station 714 may determine the location of user 718 and handheld wireless communications device 720 by coordinating with other adjacent base stations. For example, base stations 730 and 732 are also illuminated by handheld wireless communications device 720. However, the field strength at base station 730 and 732 will be much less than the field strength at base station 714. Base station 714 may therefore determine the location of user 718 and handheld wireless communications device 720 by triangulation. Base stations 710, 712, 714, and 716 will be have bandwidth or time slots allocated to detect changes in position and orientation of handheld wireless communications device 720, as opposed to base stations 730 and 732.

In operation, a user of a handheld wireless communications device such as handheld wireless communications device 720 or 726 initiates communications through a base station of a service cell. The electromagnetic radiation generated by the handheld wireless communications device illuminates 180 degrees of arc, such that if the user changes the orientation of the device, the base station illuminated by the device at the initiation of the call may no longer be illuminated by the device after the change of orientation. Unless the base station is receiving sufficient reflected electromagnetic radiation from the device to maintain the call channel, it will be necessary to hand over the call to an adjacent base station. Each base station coordinates other adjacent base stations to identify callers, locate the position of callers, and to prepare communications channels, timeslots, code channels, or other suitable communications techniques so that the call channel established a first base station may be maintained by other base stations after handover.

Figure 8:
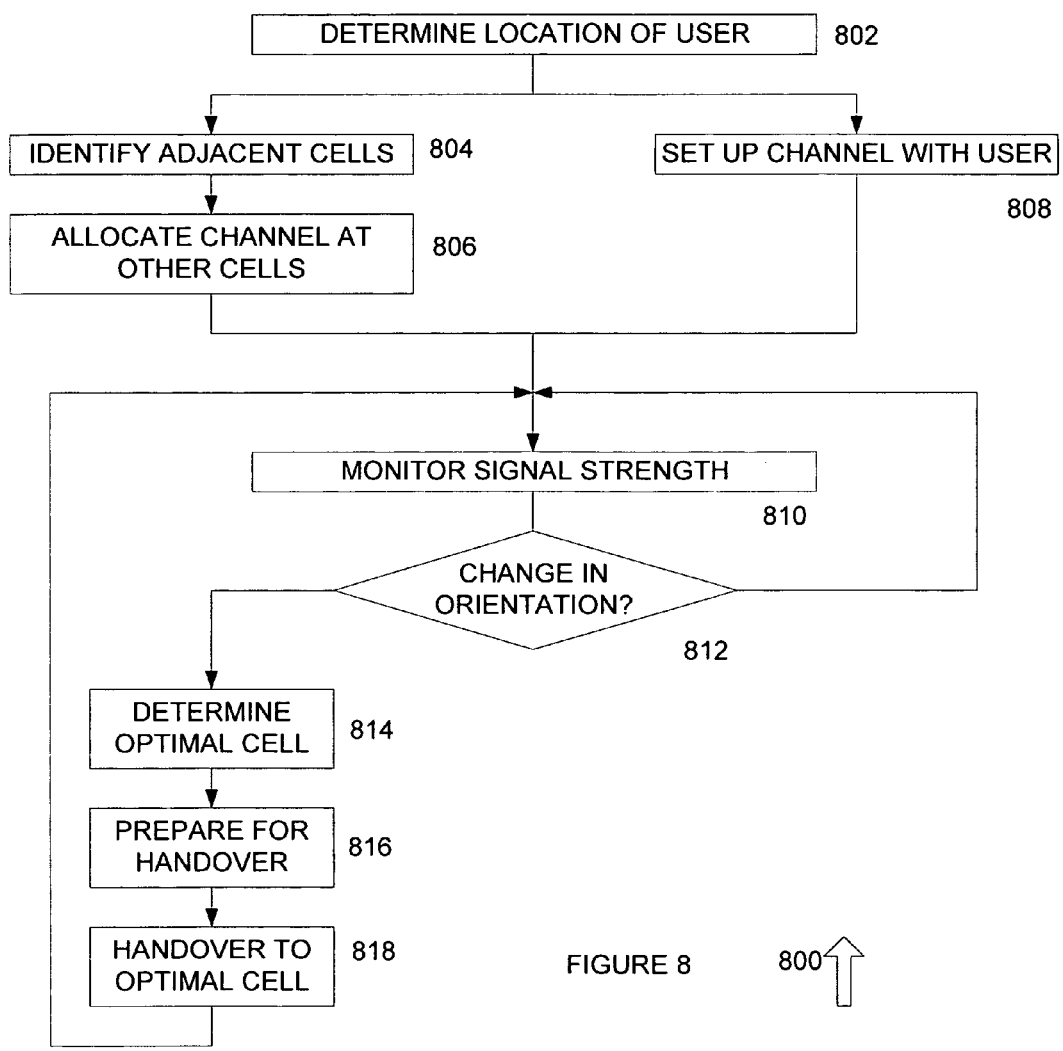
FIG. 8 is a flow chart of a method for cellular communications in accordance with an exemplary embodiment of the present invention.

FIG. 8 is a flow chart of a method 800 for cellular communications in accordance with an exemplary embodiment of the present invention. Method 800 may be used to support cellular services for systems that utilize handheld wireless communications devices having directional antennae.

Method 800 begins at step 802, where the location of a user is determined. For example, a user may turn on a handset and randomly broadcast a message to a base station until the base station recognizes the user and transmits a response. The base station may likewise transmit a signal to new users that allows the new user to determine the timing system of the base station and to broadcast a message to the base station at a suitable time. The method then proceeds to steps 804 and 808 in parallel.

At step 804, adjacent cells are identified. For example, the location of a user may be determined through triangulation with other base stations that receive the user's transmitted signal, where the signal strength of the transmitted signal may be mapped to determine the approximate location of the user. The method then proceeds to step 806 where a command or commands are transmitted to other base stations in cells adjacent to the user that will cause such base stations to allocate call resources, such as bandwidth, time slots, code channels, or other suitable call resources. The method then proceeds to step 810.

At step 808, a call channel is set up with the user. For example, the user may transmit a command to the base station that indicates that the user would like to set up a communications channel. The base station allocates call resources at step 808 to set up the channel, such as by allocating time slots, bandwidth, setting up a channel to a central office switch, and other suitable call resource allocation procedures. The method then proceeds to step 810.

At step 810, signal strength is monitored by one or more base stations to determine whether the orientation of the user is changing. For example, if triangulation is used, the loss of received signal at a distant base station may indicate that the user is changing orientation. Other suitable methods may be used. The method then proceeds to step 812, where it is determined whether such signal strength data indicates a change in orientation. If no change in orientation is detected, the method returns to step 810. Otherwise, the method proceeds to step 814.

At step 814, the optimal cell for handling the call channel is determined. For example, if two or more cells are receiving a signal from the user, the closest cell may be chosen to provide optimal signal strength. Other methods and criteria may be used to determine the optimal cell. The method then proceeds to step 816. At step 816, handover commands are generated and transmitted to the user and to the other base station to prepare for handover. For example, the user may need to change time slots, frequency, or other transmission and reception characteristics as a result of the change in base station. The method then proceeds to step 818 where the call channel is handed over to the optimal cell base station. The method then returns to step 810.

In operation, method 800 is used to support cellular communications in a system that utilizes handheld wireless communications device with directional antenna. Depending on the amount of reflectivity present in the system and other factors, methods for supporting cellular service that are different from conventional methods may be required for such devices. Method 800 allows such devices to be used without a resulting decrease in service quality.

Although preferred and exemplary embodiments of variable-gain coder-decoders and systems and methods for using variable gain coder-decoders have been described in detail herein, those skilled in the art will also recognize that various substitutions and modifications may be made to the systems and methods without departing from the scope and spirit of the appended claims.

What is claimed is:

1. A method for providing cellular communications comprising:
   determining the location of a user having a directional wireless device;
   allocating call resources at each cell encircling the user;
   setting up a call channel with the user;
   determining whether a change in orientation of the user is occurring; and
   handing over the user to an optimal cell.

2. The method of claim 1 wherein determining whether the change in orientation of the user is occurring comprises monitoring the signal strength of the directional wireless device at two or more base stations.

3. The method of claim 1 wherein handing over the user to the optimal cell comprises handing over the user to a cell which the user is turning the directional wireless device towards.

4. The method of claim 1 wherein handing over the user to the optimal cell comprises:
   transmitting a first signal from the directional wireless device to a first base station; and
   receiving a second signal at the directional wireless device from a second base station.

5. The method of claim 1 wherein handing over the user to the optimal cell comprises:
   transmitting new call channel data to the wireless device from a first base station; and
   changing the transmission characteristics at the directional wireless device to allow a transmitted signal from the directional wireless device to be received at a second base station.

6. A method for providing cellular communications comprising:
   determining the location of a user having a directional wireless device;
   allocating call resources at one or more adjacent cells;
   setting up a call channel with the user;
   determining whether a change in orientation of the user is occurring; and
   handing over the user to a cell from a set of cells that encircle the user and that each have allocated call resources awaiting the handoff.

7. The method of claim 6 wherein setting up the call channel with the user is performed in parallel with the other steps.

8. The method of claim 6 wherein determining whether the change in orientation of the user is occurring comprises monitoring a signal strength of the directional wireless device at two or more base stations.

9. The method of claim 6 wherein handing over the user to to the cell from the set of cells that encircle the user and that each have allocated call resources awaiting the handoff comprises handing over the user to a cell which the user is turning the directional wireless device towards.

10. The method of claim 6 wherein handing over the user to to the cell from the set of cells that encircle the user and that each have allocated call resources awaiting the handoff comprises:
    transmitting a first signal from the directional wireless device to a first base station; and
    receiving a second signal at the directional wireless device from a second base station.

11. The method of claim 6 wherein handing over the user to to the cell from the set of cells that encircle the user and that each have allocated call resources awaiting the handoff comprises:
    transmitting new call channel data to the wireless device from a first base station; and
    changing the transmission characteristics at the directional wireless device to allow a transmitted signal from the directional wireless device to be received at a second base station.

12. A method for providing cellular communications comprising:
    determining the location of a user having a directional wireless device;

allocating call resources at one or more adjacent cells;
setting up a call channel with the user;
determining whether a change in orientation of the user is occurring; and
handing over the user to an optimal cell.

13. The method of claim 12 wherein setting up the call channel with the user is performed in parallel with the other steps.

14. The method of claim 12 wherein determining whether the change in orientation of the user is occurring comprises monitoring a signal strength of the directional wireless device at two or more base stations.

15. The method of claim 12 wherein handing over the user to the optimal cell comprises handing over the user to a cell which the user is turning the directional wireless device towards.

16. The method of claim 12 wherein handing over the user to the optimal cell comprises:
   transmitting a first signal from the directional wireless device to a first base station; and
   receiving a second signal at the directional wireless device from a second base station.

17. The method of claim 12 wherein handing over the user to the optimal cell comprises:
   transmitting new call channel data to the wireless device from a first base station; and
   changing the transmission characteristics at the directional wireless device to allow a transmitted signal from the directional wireless device to be received at a second base station.

* * * * *

UNITED STATES PATENT AND TRADEMARK OFFICE
CERTIFICATE OF CORRECTION

PATENT NO. : 6,980,772 B1 Page 1 of 1
APPLICATION NO. : 09/821110
DATED : December 27, 2005
INVENTOR(S) : Paul A. Underbrink et al.

It is certified that error appears in the above-identified patent and that said Letters Patent is hereby corrected as shown below:

Col. 12, line 47, change "to to" to -- to -- ; and

Col. 12, line 55, change "to to" to -- to -- .

Signed and Sealed this

Eighth Day of August, 2006

JON W. DUDAS
*Director of the United States Patent and Trademark Office*